US010416040B1

(12) United States Patent
Prescott et al.

(10) Patent No.: US 10,416,040 B1
(45) Date of Patent: Sep. 17, 2019

(54) METHODS FOR CHARACTERIZING AN OPTICAL LOSS TEST SET AND DETERMINING OPTICAL LOSS (71) Applicant: AFL Telecommunications LLC, Duncan, SC (US)

(72) Inventors: Scott Prescott, Belmont, NH (US); Bin Liu, Chestnut Hill, MA (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/028,046

(22) Filed: Jul. 5, 2018

(51) Int. Cl.
*G01M 11/00* (2006.01)
*H04B 10/079* (2013.01)
(52) U.S. Cl.
CPC ....... *G01M 11/33* (2013.01); *H04B 10/07955* (2013.01)
(58) Field of Classification Search
CPC ............... G01M 11/33; H04B 10/2503; H04B 10/07955
See application file for complete search history.

(56) References Cited

U.S. PATENT DOCUMENTS

| 9,749,043 | B2 | 8/2017 | Perron | |
|---|---|---|---|---|
| 2016/0164601 | A1* | 6/2016 | Perron | G01M 11/33 398/38 |
| 2016/0218802 | A1* | 7/2016 | Ruchet | H04B 10/07955 |
| 2016/0337034 | A1* | 11/2016 | Ruchet | H04B 10/07955 |
| 2016/0356670 | A1* | 12/2016 | Brillhart | G01M 11/3136 |
| 2018/0266808 | A1* | 9/2018 | Shaar | G01M 11/3109 |
| 2018/0283937 | A1* | 10/2018 | Schell | G01M 11/33 |
| 2019/0140739 | A1* | 5/2019 | Liu | H04B 10/07955 |

* cited by examiner

*Primary Examiner* — Shawn Decenzo
(74) *Attorney, Agent, or Firm* — Dority & Manning, PA (57) ABSTRACT

Characterizing a first OLTS includes connecting a first test cable directly to a second power meter of the first OLTS, connecting the first test cable to a second test cable, and connecting the second test cable directly to a connection port of a second OLTS. The method also includes determining a first characterization power of the first OLTS by measuring an optical power of light transmitted from a light source of the second OLTS with the second power meter of the first OLTS. The method further includes disconnecting a first test cable from the second power meter of the first OLTS, connecting the first test cable directly to a connection port of the first OLTS, and determining a second characterization power of the first OLTS by measuring an optical power of light transmitted from the light source of the second OLTS with the first power meter of the first OLTS.

20 Claims, 10 Drawing Sheets

METHODS FOR CHARACTERIZING AN OPTICAL LOSS TEST SET AND DETERMINING OPTICAL LOSS

FIELD

The present disclosure relates generally to methods for characterizing optical loss test sets ("OLTSs") and methods for determining optical loss in optical devices such as fiber optic cables.

BACKGROUND

Light source power meter methods are generally known and utilized in the fiber optics industry to measure the insertion losses of the optical fibers in fiber optic cables. Typically, a fiber optic cable under test may be connected between two test cables. One test cable is connected to a light source, and the other test cable is connected to a power meter. Light is transmitted from the light source through the test cables and fiber optic cable to the power meter, and the loss in an optical fiber of the fiber optic cable is determined based on the measured power at the power meter and the power measured by referencing the light source to the power meter directly.

Modern methods for measuring such losses utilize OLTSs. In general, an OLTS includes an internal light source and a power meter. Two OLTS units can be utilized to measure bi-directional losses in a fiber optic cable.

To ensure accurate measurements, various test standards require that the test cable connected to the light source is not disconnected after referencing the light source to the power meter. However, such standards present difficulties when utilizing OLTSs and measuring bi-directional losses.

Accordingly, improved methods for calibrating OLTSs which eliminate the need to disconnect the test cable from the light source of the OLTS would be advantageous. Further, improved methods for testing fiber optic cables which reduce errors in loss measurements would be advantageous.

BRIEF DESCRIPTION

Aspects and advantages of the invention will be set forth in part in the following description, or may be obvious from the description, or may be learned through practice of the invention.

In accordance with one embodiment, the present disclosure is directed to a method of testing an optical device using a first OLTS. The method includes characterizing the first OLTS. Characterizing the first OLTS includes connecting a first end of a first test cable directly to a second power meter of the first OLTS, connecting a second end of the first test cable to a first end of a second test cable, and connecting a second end of the second test cable directly to a connection port of a second OLTS. The connection port of the second OLTS is in optical communication with a light source of the second OLTS. Characterizing the first OLTS also includes determining a first characterization power of the first OLTS by measuring an optical power of light transmitted from the light source of the second OLTS with the second power meter of the first OLTS. Characterizing the first OLTS further includes disconnecting the first end of the first test cable from the second power meter of the first OLTS and connecting the first end of the first test cable directly to a connection port of the first OLTS. The connection port of the first OLTS is in optical communication with a first power meter of the first OLTS and a light source of the first OLTS. Characterizing the first OLTS also includes determining a second characterization power of the first OLTS by measuring an optical power of light transmitted from the light source of the second OLTS with the first power meter of the first OLTS. The method also includes determining a reference power. The method further includes connecting the second end of the first test cable to the optical device, transmitting light from the light source of the first OLTS through the first test cable to the optical device, and determining a loss of the optical device based on the first characterization power, the second characterization power, the reference power, and an optical power level associated with the optical device measured with the first power meter of the first OLTS.

In accordance with another embodiment, the present disclosure is directed to a method of characterizing an optical test system. The optical test system includes a first OLTS and a second OLTS. The method includes connecting a first end of a second test cable directly to a connection port of the first OLTS. The connection port of the first OLTS is in optical communication with a first power meter of the first OLTS and a stabilized light source of the first OLTS. The method also includes connecting a second end of the second test cable directly to a second power meter of the second OLTS. The method further includes transmitting light from the stabilized light source of the first OLTS to the second power meter of the second OLTS through the second test cable and measuring an optical power of the transmitted light from the stabilized light source of the first OLTS with the second power meter of the second OLTS. The method also includes disconnecting the second end of the second test cable from the second power meter of the second OLTS and connecting the second end of the second test cable directly to a connection port of the second OLTS. The connection port of the second OLTS is in optical communication with a first power meter of the second OLTS and a stabilized light source of the second OLTS. The method also includes transmitting light from the stabilized light source of the first OLTS to the first power meter of the second OLTS through the second test cable and measuring an optical power of the transmitted light from the stabilized light source of the first OLTS with the first power meter of the second OLTS. The method further includes disconnecting the first end of the second test cable from the connection port of the first OLTS, connecting a first end of a first test cable directly to a second power meter of the first OLTS, and connecting a second end of the first test cable directly to the first end of the second test cable. The method also includes transmitting light from the stabilized light source of the second OLTS to the second power meter of the first OLTS through the first test cable and the second test cable and measuring an optical power of the transmitted light from the stabilized light source of the second OLTS with the second power meter of the first OLTS. The method further includes disconnecting the first end of the first test cable from the second power meter of the first OLTS, connecting the first end of the first test cable directly to the connection port of the first OLTS, transmitting light from the stabilized light source of the second OLTS to the first power meter of the first OLTS through the first test cable and the second test cable, and measuring an optical power of the transmitted light from the stabilized light source of the second OLTS with the first power meter of the first OLTS.

In accordance with another embodiment, the present disclosure is directed to a method of characterizing an optical test system. The optical test system includes a first OLTS and a second OLTS. The method includes obtaining a first characterization power value for the first OLTS by connecting a first end of a first test cable directly to a second power meter of the first OLTS and connecting a second end of the first test cable to a first end of a second test cable. The second test cable includes a second end connected directly to a connection port of the second OLTS. The connection port of the second OLTS is in optical communication with a first power meter of the second OLTS and a stabilized light source of the second OLTS. Obtaining the first characterization power value also includes transmitting light from the stabilized light source of the second OLTS through the first and second test cables to the second power meter of the first OLTS and measuring an optical power of the transmitted light from the stabilized light source of the second OLTS with the second power meter of the first OLTS. The method also includes obtaining a second characterization power value for the first OLTS by disconnecting the first end of the first test cable from the second power meter of the first OLTS and connecting the first end of the first test cable directly to a connection port of the first OLTS. The connection port of the first OLTS is in optical communication with a first power meter of the first OLTS and a stabilized light source of the first OLTS. Obtaining the second characterization power value also includes transmitting light from the stabilized light source of the second OLTS through the first and second test cables to the first power meter of the first OLTS and measuring an optical power of the transmitted light from the stabilized light source of the second OLTS with the first power meter of the first OLTS.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the Figures, the present disclosure is generally directed to methods and apparatus which advantageously facilitate improved insertion loss testing and OLTS accuracy. For example, methods according to the present disclosure generally provide characterization of one OLTS with another OLTS, and vice versa. In various embodiments, e.g., as illustrated in FIGS. 1 through 6, one OLTS may be referred to as a first OLTS 100 (also identified as OLTS1, e.g., in FIGS. 1-6) and another OLTS may be referred to as a second OLTS 200 (also identified as OLTS2, e.g., in FIGS. 1-6). As illustrated, each OLTS generally includes an internal stabilized light source (LS), a first optical power meter (PM1), and a second optical power meter (PM2). A stabilized light source LS is generally a light source that has a constant, non- or low-fluctuating power output over a given period of time at a specific ambient temperature, for example ±0.05 dB for 1 hour at 23° C. For example, the first OLTS 100 may include LS 102 and PM1 104 which are connected to an optical branching device 106 (which may for example include a splitter and/or other suitable apparatus, such as optical fiber couplers, etc., for providing such branching). The LS 102 and the PM1 104 of the first OLTS 100 are both in optical communication with a connection port 108 of the first OLTS 100 via the optical branching device 106. Additionally, the first OLTS 100 may include PM2 110 with an input port 112 providing optical communication with the PM2 110. Similarly, the second OLTS 200 may include LS 202 and PM1 204 which are connected to an optical branching device 206 and the LS 202 and the PM1 204 of the second OLTS 200 are both in optical communication with a connection port 208 of the second OLTS 200 via the optical branching device 206. Additionally, the second OLTS 200 may include PM2 210 with an input port 212 providing optical communication with the PM2 210. In various embodiments, the input ports 112 and 212 may be integrated into the respective second power meters 110 and 210.

The ports, e.g., the connection ports 108 and 208 and the input ports 112 and 212 of each respective OLTS 100 and 200, may be contact-based ports or contactless ports, and a suitable connector of a suitable cable as discussed herein may be connected to any of the ports to facilitate optical communication with the respective power meter and/or light source.

One or both of the first and second OLTS 100/200 may further include a controller 120/220. The controller 120/220 may be in communication with other components of the respective OLTS 100/200, including the first optical power meter 104/204, second optical power meter 110/210, and internal light source 102/202. Controller 120/220 may be configured and operable to cause such other components to perform the various operations and method steps as discussed herein.

Controller 120/220 may generally comprise a computer or any other suitable processing unit. For example, the controller 120/220 may include one or more processor(s) and associated memory device(s) configured to perform a variety of computer-implemented functions, as discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 120/220 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 120/220 to perform various computer-implemented functions including, but not limited to, performing the various steps discussed herein. In addition, the controller 120/220 may also include various input/output channels for receiving inputs from and for sending control signals to the various other components of the OLTS 100/200, including the first optical power meter 104/204, second optical power meter 110/210, and internal light source 102/202, as well as to components of other OLTSs in a system of OLTSs.

In various embodiments, the present disclosure is directed to methods including characterizing at least one OLTS of an optical test system, where the optical test system includes a first OLTS and a second OLTS. It should be understood that in exemplary embodiments, one or more controllers 120/220 may be utilized to perform the various steps as discussed herein. As described in more detail below, one or both of the first OLTS and the second OLTS may be calibrated or characterized with the other of the first OLTS and the second OLTS in various embodiments of the disclosed methods.

Figure 1:
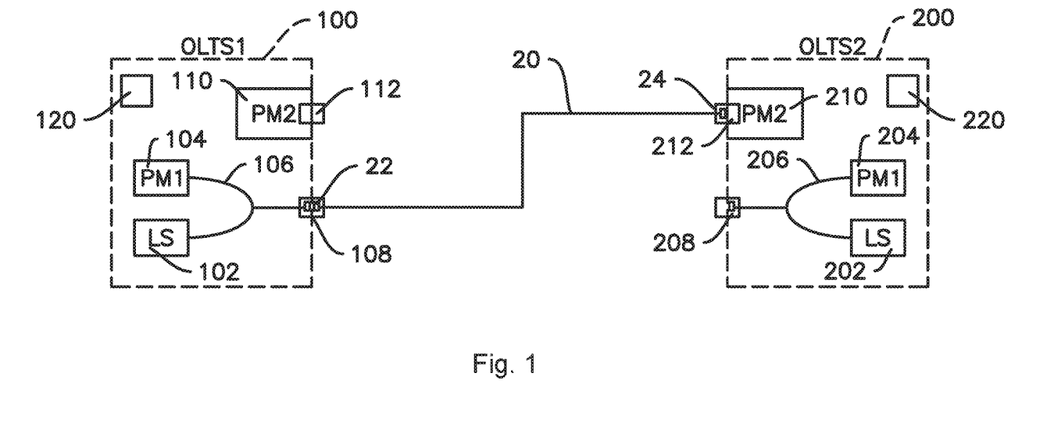
FIG. 1 is a schematic illustrating a first characterization power value of the second OLTS being obtained in accordance with one or more embodiments of the present disclosure.
Figure 2:
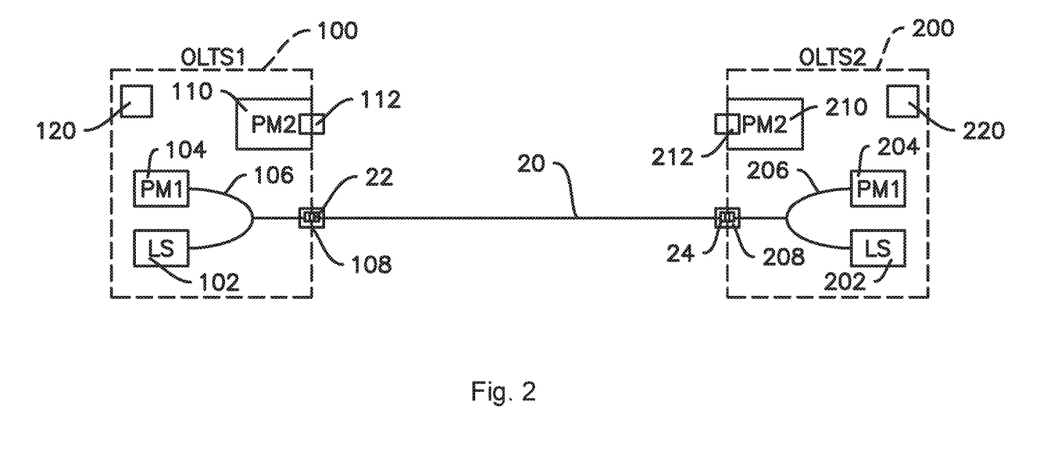
FIG. 2 is a schematic illustrating a second characterization power value of the second OLTS of FIG. 1 being obtained.

For example, in some embodiments, a method of characterizing an optical test system, the optical test system including a first OLTS 100 and a second OLTS 200, may include connecting the first and second OLTSs with a test cable, e.g., a second test cable 20 as shown in FIGS. 1 and 2. For example, as shown in FIG. 1, the second test cable 20 may extend between a first end 22 and a second end 24, and a connector may be disposed at each end to facilitate the various necessary connections. The exemplary methods may include connecting the first end 22 of the second test cable 20 directly to the connection port 108 of the first OLTS 100. As mentioned above, the connection port 108 of the first OLTS 100 may be in optical communication with the first power meter 104 of the first OLTS 100 and the stabilized light source 102 of the first OLTS 100, such as via optical branching device 106. Also as shown in FIG. 1, exemplary methods may include connecting the second end 24 of the second test cable 20 directly to the second power meter 210 of the second OLTS 200, such as at the input port 212, as illustrated. With the second test cable 20 so connected, exemplary methods may then include transmitting light from the stabilized light source 102 of the first OLTS 100 to the second power meter 210 of the second OLTS 200 through the second test cable 20. In at least some embodiments, transmitting light from the stabilized light source 102 of the first OLTS 100 may include light transmitted at a predetermined power from the stabilized light source 102. For example, the stabilized light source 102 may be activated to emit light at a predetermined power. A received power may be determined, e.g., by measuring an optical power of the transmitted light from the stabilized light source 102 of the first OLTS 100 with the second power meter 210 of the second OLTS 200. The power value derived from this measurement may be a first characterization power value of the second OLTS 200. That is, a first characterization power of the second OLTS 200 may be determined or obtained by measuring the optical power of the transmitted light from the light source 102 of the first OLTS 100 with the second power meter 210 of the second OLTS 200.

Turning now to FIG. 2, characterizing the second OLTS 200 may further include disconnecting the second end of the second test cable from the second power meter of the second OLTS and connecting the second end of the second test cable directly to a connection port of the second OLTS. As mentioned above, the connection port 208 of the second OLTS 200 may be in optical communication with the first power meter 204 of the second OLTS 200 and the stabilized light source 202 of the second OLTS 200, such as via optical branching device 206. With the second test cable 20 so connected, exemplary methods may then include transmitting light from the stabilized light source 102 of the first OLTS 100 to the first power meter 204 of the second OLTS 200 through the second test cable 20 and measuring an optical power of the transmitted light from the stabilized light source 102 of the first OLTS 100 with the first power meter 204 of the second OLTS 200. The power value derived from this measurement may be a second characterization power value of the second OLTS 200. That is, a second characterization power of the second OLTS 200 may be determined or obtained by measuring the optical power of the transmitted light from the light source 102 of the first OLTS 100 with the first power meter 204 of the second OLTS 200.

Figure 3:
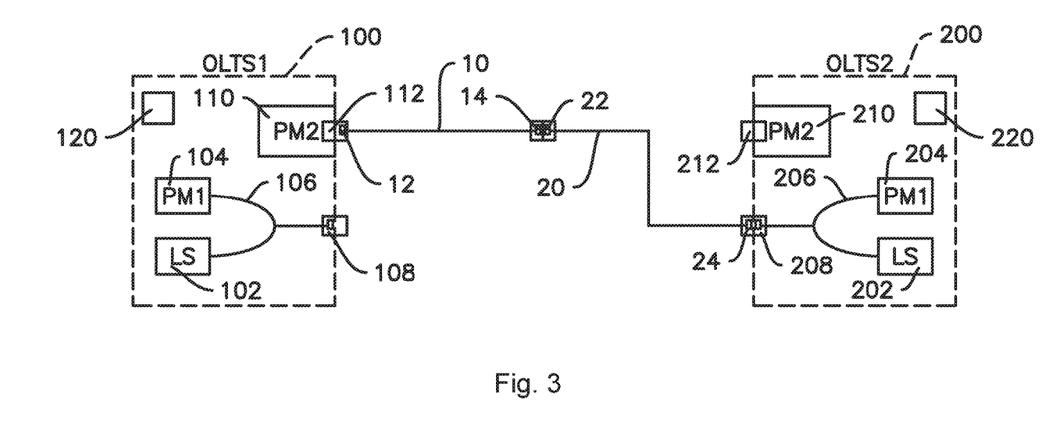
FIG. 3 is a schematic illustrating a first characterization power value of the first OLTS being obtained in accordance with one or more embodiments of the present disclosure.

Turning now to FIG. 3, exemplary methods of characterizing the optical test system may further include characterizing the first OLTS 100 with the second OLTS 200. In some embodiments, such methods may include disconnecting the first end 22 of the second test cable 20 from the connection port 108 of the first OLTS 100 and connecting a first end 12 of a first test cable 10 directly to a second power meter 110 of the first OLTS 100. For example, the first end 12 of the first test cable 10 may be directly connected to the input port 112 of the second power meter 110. The exemplary methods may also include connecting a second end 14 of the first test cable 10 directly to the first end 22 of the second test cable 20. Similar to the second test cable 20, the first test cable 10 may extend between the first end 12 and the second end 14, and a connector may be disposed at each end to facilitate the various necessary connections. With the first test cable 10 and the second test cable 20 so connected, as shown in FIG. 3, exemplary methods may include transmitting light from the stabilized light source 202 of the second OLTS 200 to the second power meter 110 of the first OLTS 100 through the first test cable 10 and the second test cable 20. As mentioned above with respect to the stabilized light source 102 of the first OLTS 100, in at least some embodiments, transmitting light from the stabilized light source 202 of the second OLTS 200 may include light transmitted at a predetermined power from the stabilized light source 202. For example, the stabilized light source 202 of the second OLTS 200 may be activated to emit light at a predetermined power. A first characterization power value of the first OLTS 100 may then be determined or obtained by measuring an optical power of the transmitted light from the stabilized light source 202 of the second OLTS 200 with the second power meter 110 of the first OLTS 100.

Figure 4:
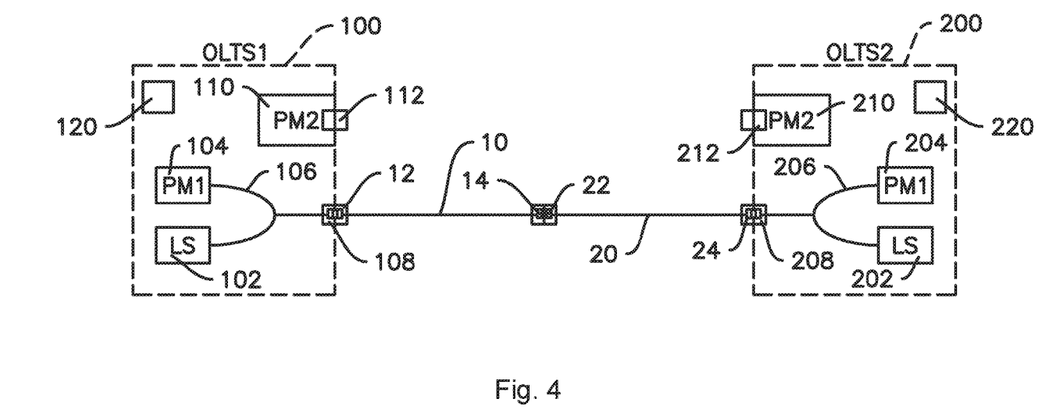
FIG. 4 is a schematic illustrating a second characterization power value of the first OLTS of FIG. 3 being obtained.

Characterizing the first OLTS 100 may further include disconnecting the first end 12 of the first test cable 10 from the second power meter 110 of the first OLTS 100 and connecting the first end 12 of the first test cable 10 directly to the connection port 108 of the first OLTS 100, e.g., as shown in FIG. 4. In this configuration, exemplary methods may then include transmitting light from the stabilized light source 202 of the second OLTS 200 to the first power meter 104 of the first OLTS 100 through the first test cable 10 and the second test cable 20 and measuring an optical power of the transmitted light from the stabilized light source 202 of the second OLTS 200 with the first power meter 104 of the first OLTS 100. For example, a second characterization power value of the first OLTS 100 may be determined or obtained by measuring an optical power of light transmitted from the light source 202 of the second OLTS 200 with the first power meter 104 of the first OLTS 100.

In various embodiments, the first test cable 10 remains connected to the first OLTS 100 after the characterization is complete and the second test cable 20 remains connected to the second OLTS 200 after the characterization is complete. For example, the second end 24 of the second test cable 20 may remain connected to the connection port 208 of the second OLTS 200 after the step of connecting the second end 24 of the second test cable 20 to the connection port 208 of the second OLTS 200. As another example, the first end 12 of the first test cable 10 may remain connected to the connection port 108 of the first OLTS 100 after the step of connecting the first end 12 of the first test cable 10 to the connection port of the first OLTS 100. For example, in at least some embodiments, the exemplary methods may not include disconnecting the second end 24 of the second test cable 20 from the connection port 208 of the second OLTS 200 or disconnecting the first end 12 of the first test cable 10 from the connection port 108 of the first OTLS 100, e.g., where the second OLTS 200 is characterized prior to characterizing the first OLTS 100, and is characterized using only the second test cable 20 without using the first test cable 10 when characterizing the second OLTS 200.

Figure 5:
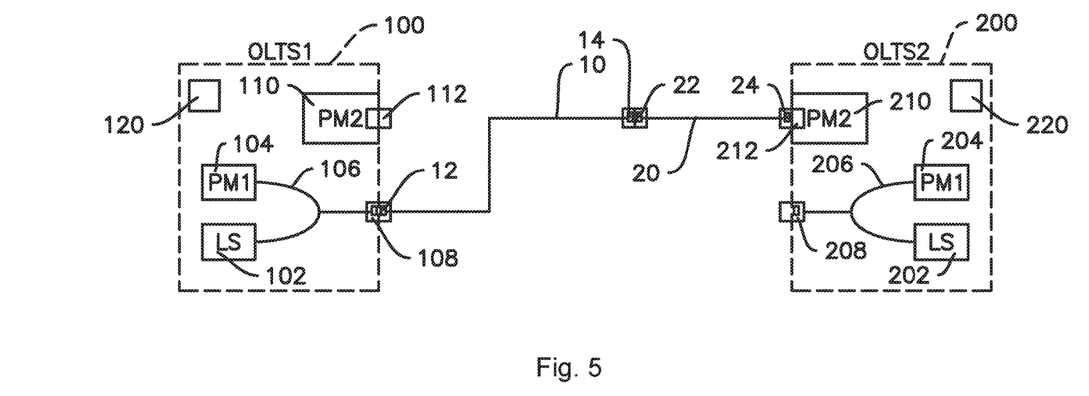
FIG. 5 is a schematic illustrating a first characterization power value of the second OLTS being obtained in accordance with one or more additional embodiments of the present disclosure.
Figure 6:
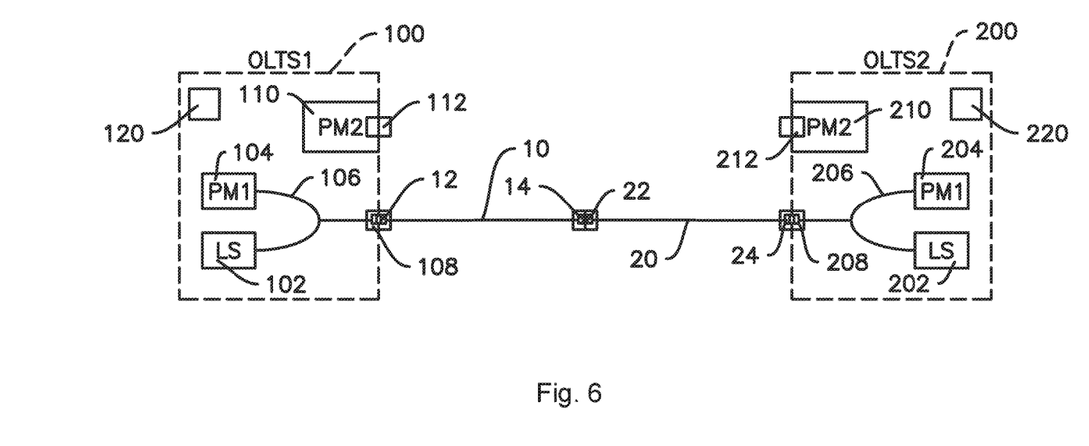
FIG. 6 is a schematic illustrating a second characterization power value of the second OLTS of FIG. 5 being obtained.

In various embodiments, exemplary methods according to the present disclosure may include characterizing one or both of the first OLTS 100 and the second OLTS 200. Exemplary methods according to the present disclosure may also include, as discussed in further detail below, testing an optical device with the first OLTS 100 and/or the second OLTS 200 after characterizing one or both of the first OLTS 100 and the second OLTS 200. Turning now to FIGS. 5 and 6, exemplary configurations are illustrated for characterizing the second OLTS 200 according to various additional embodiments of the present disclosure. For example, the configurations illustrated in FIGS. 5 and 6 may be included in a method of characterizing the second OLTS 200, may be combined with the above-described steps of characterizing the first OLTS 100 in a method of characterizing the optical test system, and/or may be included in exemplary methods of testing an optical device.

As shown in FIG. 5, characterizing the second OLTS 200 may include connecting the first end 12 of the first test cable 10 directly to the connection port 108 of the first OLTS 100, connecting the second end 14 of the first test cable 10 directly to the first end 22 of the second test cable 20, and connecting the second end 24 of the second test cable 20 directly to the second power meter 210 of the second OLTS 200, e.g., via the input port 212 of the second power meter 210. Using the configuration illustrated in FIG. 5, characterizing the second OLTS 200 may further include transmitting light from the light source 102 of the first OLTS 100 through the first test cable 10 and the second test cable 20 to the second power meter 210 of the second OLTS 200 and determining a first characterization power of the second OLTS 200 by measuring an optical power of the transmitted light from the light source 102 of the first OLTS 100 with the second power meter 210 of the second OLTS 200.

As shown in FIG. 6, exemplary methods of characterizing the second OLTS 200 may further include disconnecting the second end 24 of the second test cable 20 from the second power meter 210 of the second OLTS 200 and connecting the second end 24 of the second test cable 20 directly to the connection port 208 of the second OLTS 200. With the cables 10 and 20 so connected, exemplary methods may then include transmitting light from the light source 102 of the first OLTS 100 through the first test cable 10 and the second test cable 20 to the first power meter 204 of the second OLTS 200. A second characterization power of the second OLTS 200 may then be determined or obtained by measuring an optical power of the transmitted light from the light source 102 of the first OLTS 100 with the first power meter 204 of the second OLTS 200.

As mentioned above, exemplary methods according to the present disclosure may include testing an optical device, e.g., with one or both of the first OLTS 100 and the second OLTS 200, where one or both of the first OLTS 100 and the second OLTS 200 have been calibrated or characterized according to the exemplary methods described above and illustrated in FIGS. 1-6. It should be understood that in exemplary embodiments, one or more controllers 120/220 may be utilized to perform the various steps as discussed herein.

For example, in some embodiments, exemplary methods of testing an optical device may include characterizing at least the first OLTS 100 according to one or more methods described above and shown in FIGS. 3 and 4. Such exemplary testing methods may further include determining at least one reference power and determining a loss of the optical device based in part on the at least one reference power. In various embodiments, exemplary testing methods may also include connecting the second end 14 of the first test cable 10 to the optical device 300 (e.g., FIGS. 9 and 11), transmitting light from the light source 102 of the first OLTS 100 through the first test cable 10 to the optical device 300 and determining a loss of the optical device 300 based on the first characterization power of the first OLTS 100, the second characterization power of the first OLTS 100, the at least one reference power, and an optical power level associated with the optical device 300 measured with the first power meter 104 of the first OLTS 100.

In exemplary methods of testing an optical device as described above, the first end of the first test cable may advantageously remain connected to the connection port of the first OLTS and the second end of the second test cable may advantageously remain connected to the connection port of the second OLTS throughout the steps of determining the reference power, connecting the second end of the first test cable to the optical device, transmitting light from the light source of the first OLTS through the first test cable to the optical device, and determining the loss of the optical device.

Figure 7:
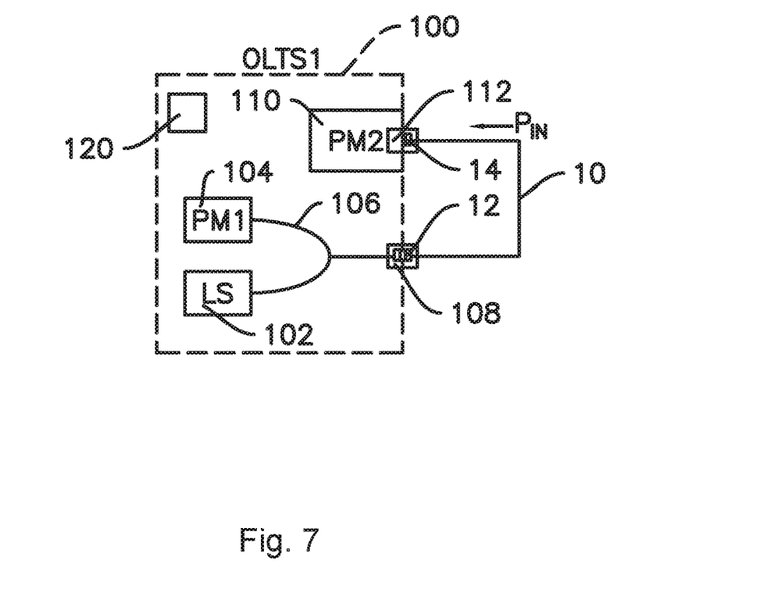
FIG. 7 is a schematic illustrating a first reference power such as may be used in optical return loss testing being obtained in accordance with one or more embodiments of the present disclosure.

In some exemplary methods, determining the loss of the optical device may include determining an optical return loss. The optical return loss may be determined based a first reference power, e.g., an input power $P_{IN}$ (e.g., FIG. 7), and a second reference power, e.g., and an internally reflected power $P_{RS}$ (e.g., FIG. 8). Exemplary embodiments of determining the at least one reference power may include connecting the second end 14 of the first test cable 10 to the second power meter 110 of the first OLTS 100, as shown in FIG. 7. In this configuration, the first reference power, e.g., $P_{IN}$, may be determined based on an optical power measured from the light source 102 of the first OLTS 100 to the second power meter 110 of the first OLTS 100.

Figure 8:
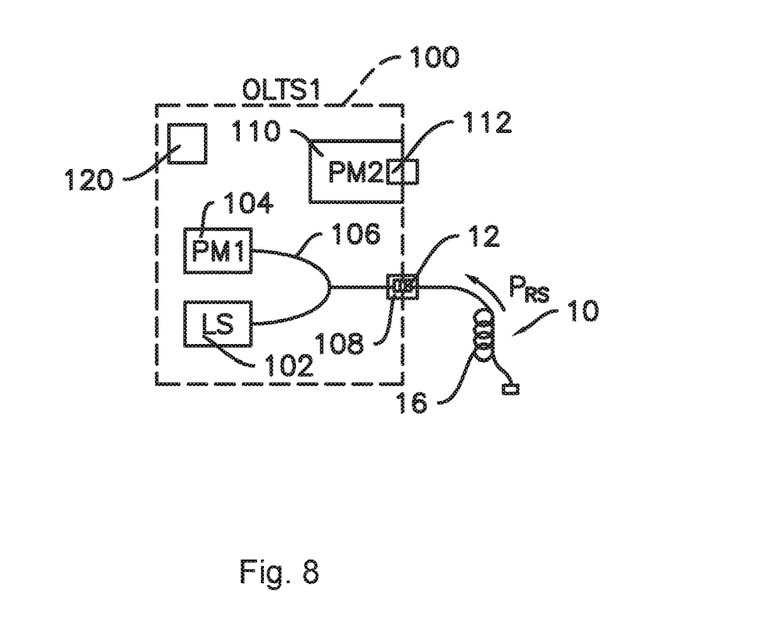
FIG. 8 is a schematic illustrating a second reference power such as may be used in optical return loss testing being obtained in accordance with one or more embodiments of the present disclosure.

As shown in FIG. 8, in such exemplary embodiments, determining the at least one reference power may further include disconnecting the second end 14 of the first test cable 10 from the second power meter 110 of the first OLTS 100 and applying an optical termination 16 at the second end 14 of the first test cable 10 or at the first test cable 10 itself. Thus, a second reference power may be determined by measuring the internally reflected power $P_{RS}$ within the OLTS 100.

Figure 9:
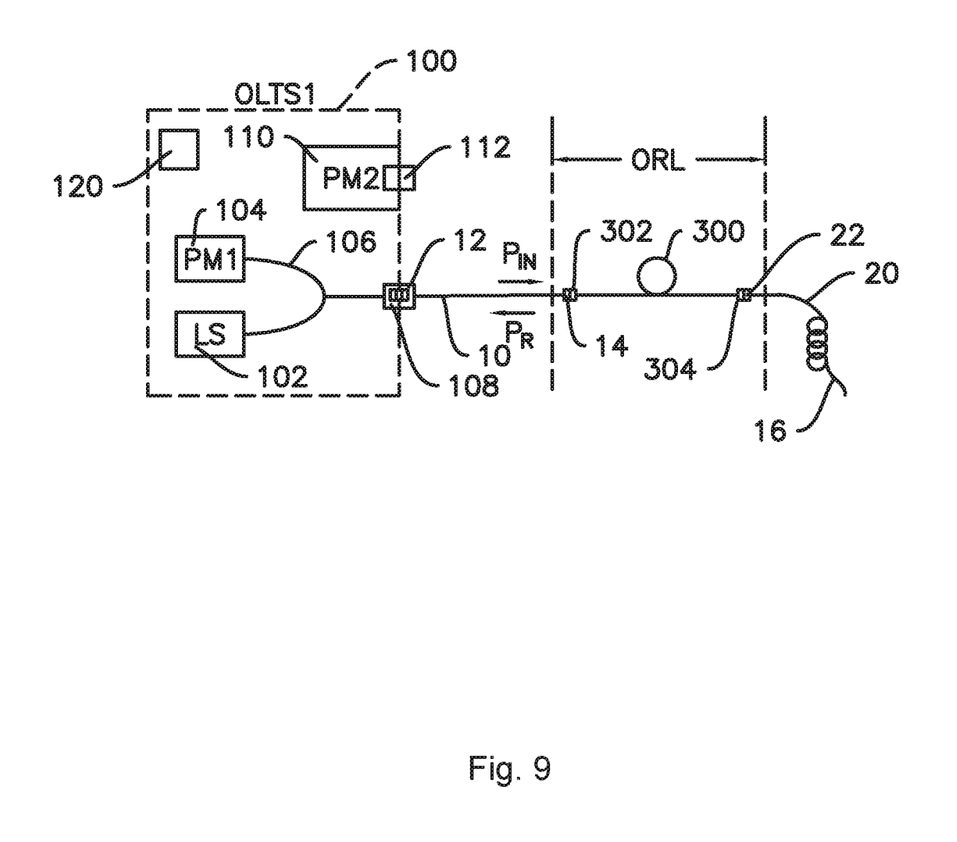
FIG. 9 is a schematic illustrating a testing configuration such as may be used in optical return loss testing in accordance with one or more embodiments of the present disclosure.

As shown in FIG. 9, some embodiments where determining the loss of the optical device and determining an optical return loss ORL may include connecting the second end 14 of the first test cable 10 directly to a first end 302 of the optical device 300, which in the illustrated example embodiment of FIG. 9 is a fiber optic cable 300. Exemplary methods may further include connecting the first end 22 of the second test cable 20 directly to a second end 304 of the optical device 300 and applying an optical termination 16 at the second end 24 of the second test cable 20 or at the second test cable 20 itself. In the illustrative examples provided in FIGS. 8 and 9, the optical termination 16 is formed as a mandrel wrapping of the first test cable 10 itself (FIG. 8) and the second test cable 20 itself (FIG. 9). In other embodiments, any suitable optical termination 16 may be provided, such as but not limited to a direct connection to the second OLTS 200 or a connection to the second OLTS 200 via the second test cable 20. In such embodiments, the optical power level associated with the optical device measured with the first power meter 104 of the first OLTS 100 may be an optical power level of reflected light $P_R$ from the optical device 300.

The optical return loss ORL, in decibels (dB), may be calculated based on the input power ($P_{IN}$), the internally reflected power ($P_{RS}$), the optical power level of reflected light ($P_R$) from the optical device 300, the first characterization power of the first OLTS 100 ($P_{PM1}$), and the second characterization powers of the first OLTS 100 ($P_{OPM1}$), e.g., using the following equation:

$$ORL = P_{in} - 10 \times \log\left(10^{\frac{P_R}{10}} - 10^{\frac{P_{RS}}{10}}\right) - (P_{OPM1} - P_{PM1}) \text{ [dB]}$$

Figure 10:
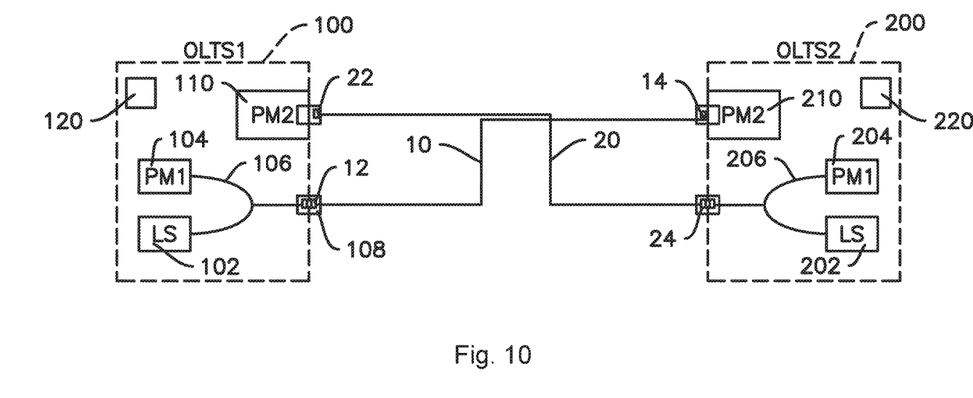
FIG. 10 is a schematic illustrating a referencing configuration such as may be used for obtaining a reference power for use in bi-directional testing in accordance with one or more additional embodiments of the present disclosure.
Figure 11:
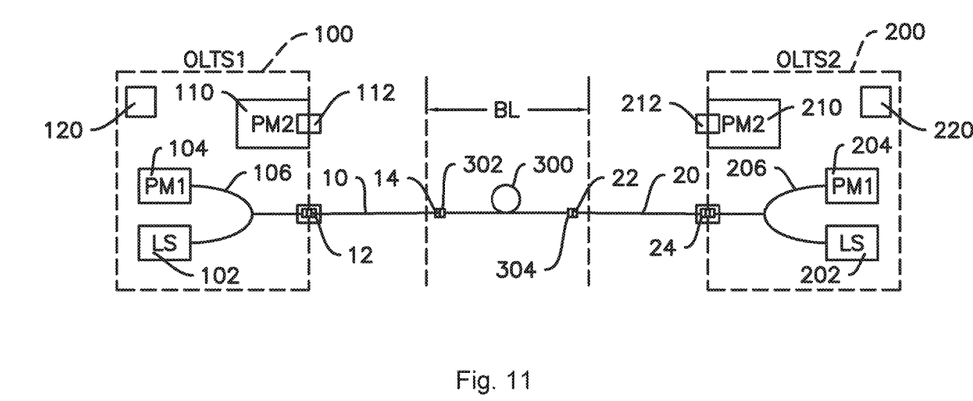
FIG. 11 is a schematic illustrating a testing configuration such as may be used in bi-directional testing in accordance with one or more embodiments of the present disclosure.

Referring now to FIGS. 10 and 11, as another example, in some exemplary methods, determining the loss of the optical device may include determining a bi-directional loss BL (FIG. 11). The bi-directional loss may be determined based on a reference power, where the reference power may be determined by connecting the second end 14 of the first test cable 10 directly to the second power meter 210 of the second OLTS 200 and connecting the first end 22 of the second test cable 20 directly to the second power meter 110 of the first OLTS 100, e.g., as shown in FIG. 10. Exemplary embodiments of determining the at least one reference power may further include determining a first reference power measured from the light source 102 of the first OLTS 100 to the second power meter 200 of the second OLTS 200, e.g., measuring an optical power of light transmitted from the light source of the first OLTS to the second power meter of the second OLTS. In such exemplary methods, the at least one reference power may also include a second reference power and the second reference power may be measured from the light source 202 of the second OLTS 200 to the second power meter 110 of the first OLTS 100, e.g., the second reference power may be determined by measuring an optical power of light transmitted from the light source 202 of the second OLTS 200 to the second power meter 110 of the first OLTS 100.

Turning now to FIG. 11, in exemplary methods where determining the loss of the optical device includes the bi-directional loss, the step of connecting the second end 14 of the first test cable 10 to the optical device 300 may include connecting the second end 14 of the first test cable 10 directly to the first end 302 of the optical device 300 and connecting the first end 22 of the second test cable 20 directly to the second end 304 of the optical device 300. Exemplary methods may further include transmitting light from the light source 202 of the second OLTS 200 through the second cable 20 to the optical device 300. Thus, embodiments such as that illustrated in FIG. 11 may include bi-directional light transmission through the optical device 300, e.g., in a first direction from the light source 102 of the first OLTS 100 to the first power meter 204 of the second OLTS 200 and in a second, opposite, direction from the light source 202 of the second OLTS 200 to the first power meter 104 of the first OLTS 100. In such embodiments, the bi-directional loss of the optical device 300 may be determined based on an optical power level of light transmitted from the light source 202 of the second OLTS 200 measured with the first power meter 104 of the first OLTS 100 and an optical power level of light transmitted from the light source 102 of the first OLTS 100 measured with the first power meter 204 of the second OLTS 200.

The bi-directional loss BL, in decibels (dB), may be calculated based on the first reference power (P1), the second reference power (P1'), the optical power level of light transmitted from the light source 102 of the first OLTS 100 through the optical device 300 measured with the first power meter 204 of the second OLTS 200 (P2), the optical power level of light transmitted from the light source 202 of the second OLTS 200 through the optical device 300 measured with the first power meter 104 of the first OLTS 100 (P2'), the first characterization power of the first OLTS 100 ($P_{PM1}$), the second characterization powers of the first OLTS 100 ($P_{OPM1}$), the first characterization power of the second OLTS 200 ($P_{PM2}$), and the second characterization power of the second OLTS 200 ($P_{OPM2}$), e.g., using the following equations:

For the direction of OLTS1→OLTS2, the loss=P1−P2−$P_{OPM2}$−$P_{PM2}$) [dB].

For the direction of OLTS2→OLTS1, the loss=P1'−P2'−$P_{OPM1}$−$P_{PM1}$) [dB].

In some embodiments, the cables, e.g., first and second test cables 10 and 20, and in at least some embodiments, the optical device 300, may be a single-fiber cable which includes only a single optical fiber. In these embodiments, only a single second optical power meter 110/210 and internal light source 102/202 are needed in each of the first and second OLTS 100 and 200, and the connectors are single-fiber connectors. In other embodiments, as illustrated in FIGS. 12 through 23, the cables may be multiple-fiber cables each of which includes a plurality of optical fibers. In these embodiments, one or more sets of second optical power meter 110/210 and internal light source 102/202 may be needed in the first OLTS 100 and the second OLTS 200, and the connectors may be multiple-fiber connectors, such as Multiple-Fiber Push-On ("MPO") connectors.

Figure 12:
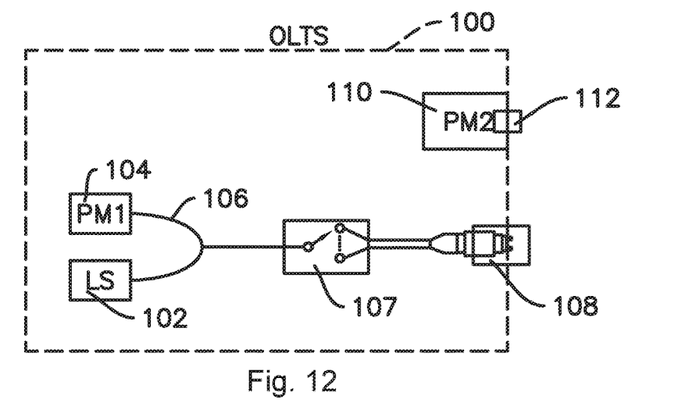
FIG. 12 is a schematic illustrating an OLTS such as may be used with multi-fiber push-on cables in accordance with one or more embodiments of the present disclosure.
Figure 14:
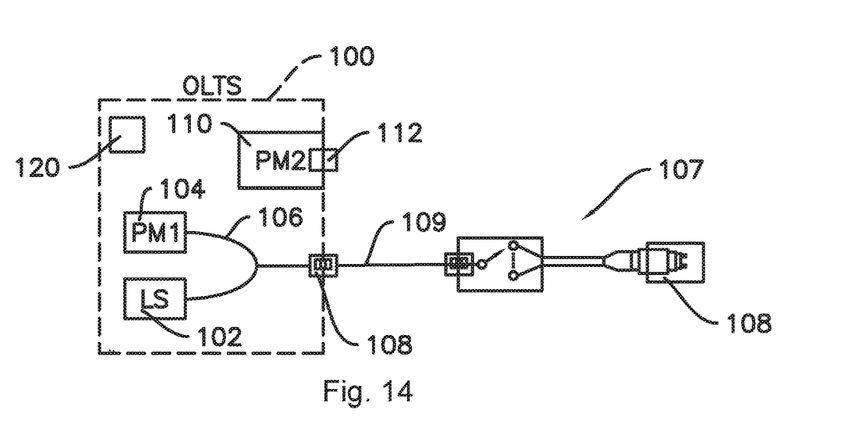
FIG. 14 is a schematic illustrating an OLTS such as may be used with multi-fiber push-on cables in accordance with one or more additional embodiments of the present disclosure.

In multiple-fiber embodiments, additional components may be included to facilitate the various connections with the OLTS. For example, as illustrated in FIGS. 12 and 14, an optical switch 107 may be provided in some embodiments, either internally to the OLTS 100 as an integral part of the OLTS 100, as illustrated in FIG. 12, or externally of the OLTS 100 and connected to the connection port 108 via a patch cable 109, as illustrated in FIG. 14. For example, as shown in FIG. 12, the optical switch 107 may be disposed between the connection port 108 and the optical branching device 106. In other embodiments, as illustrated in FIG. 14, the optical switch 107 may be external to the OLTS 100, and any connection to the connection port 108 may be an indirect connection through the optical switch 107 and the patch cable 109. Optical switch 107 may, in these embodiments, provide switching between the various fibers of a multiple-fiber cable connected to the connection port 108, to allow optical communication between each optical fiber of the plurality of optical fibers in the MPO cable and the first power meter 104 and internal light source 102 within the OLTS 100. One of skill in the art will recognize that an MPO cable is a multi-fiber cable having at least one MPO connector, and that such cables are but one example of possible multi-fiber cables usable with various embodiments of the present disclosure.

Figure 13:
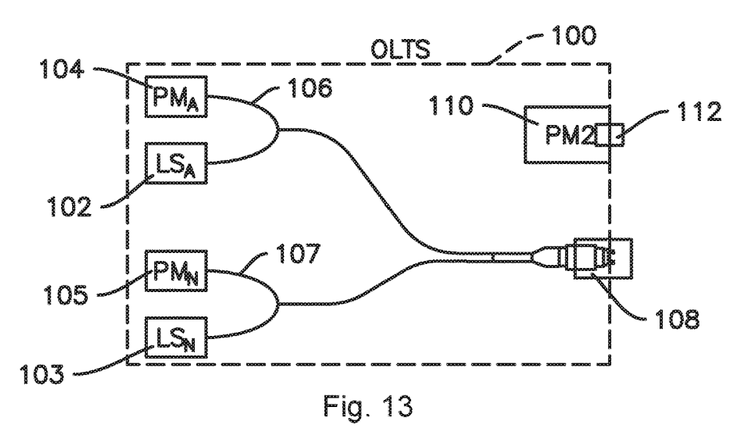
FIG. 13 is a schematic illustrating an OLTS such as may be used with multi-fiber push-on cables in accordance with one or more additional embodiments of the present disclosure.

In other embodiments, as illustrated in FIG. 13, multiple sets of the first power meter 104 and internal light source 102 are provided in the OLTS 100, e.g., a first set of $PM_A$ 104 and $LS_A$ 102 through an $N^{th}$ set of $PM_N$ 105 and $LS_N$ 103. One of skill in the art will recognize that the $N^{th}$ set may be a second set, a third set, or any other suitable number of sets of the first power meter and the internal light source may be provided. When connected to the connection port 108 in the embodiment illustrated by FIG. 13, each optical fiber of a multiple-fiber cable may be in optical communication with one of the plurality of sets of the first power meter $PM_A$ through $PM_N$ and internal light source $LS_A$ through $LS_N$.

FIGS. 15 through 18 illustrate exemplary methods of characterizing a first OLTS 100 (OLTS1) and a second OLTS 200 (OLTS2), wherein the first test cable 10 and the second test cable 20 each comprises a multi-fiber push-on (MPO) cable. Further, some embodiments which include MPO cables may include a third test cable 30, which in these embodiments is also a MPO cable. Where MPO connectors are typically gendered connectors, the third test cable 30 may be provided in order to permit gender matching between the first test cable 10 and the second test cable 20. In other embodiments, the third test cable 30 may be omitted, e.g., when the MPO connectors of the first test cable 10 and the second test cable 20 are gender matched, e.g., where the second end 14 of the first test cable 10 includes one of a male MPO connector and a female MPO connector, and the first end 22 of the second test cable 20 includes the other of the male MPO connector and the female MPO connector. In embodiments where the third test cable 30 is included, connecting the second end 14 of the first test cable 10 to the first end 22 of the second test cable 20, e.g., during characterizing the first OLTS 100, may include connecting the second end 12 of the first test cable 10 directly to a first end 32 of the third test cable 30 and connecting a second end 34 of the third test cable 30 directly to the first end 22 of the second test cable 20.

Figure 15:
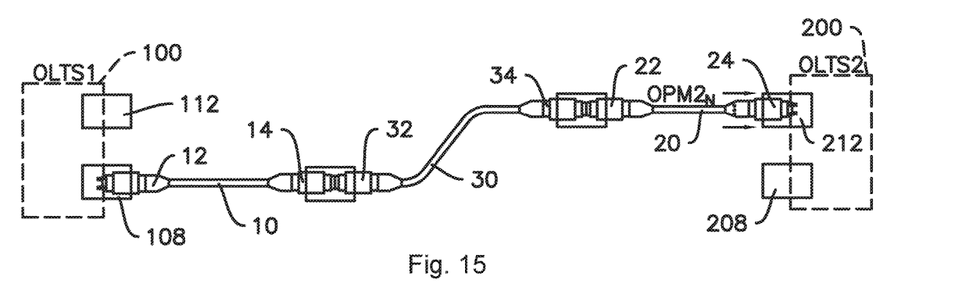
FIG. 15 is a schematic illustrating a first characterization power value of the second OLTS being obtained in accordance with one or more further embodiments of the present disclosure.
Figure 16:
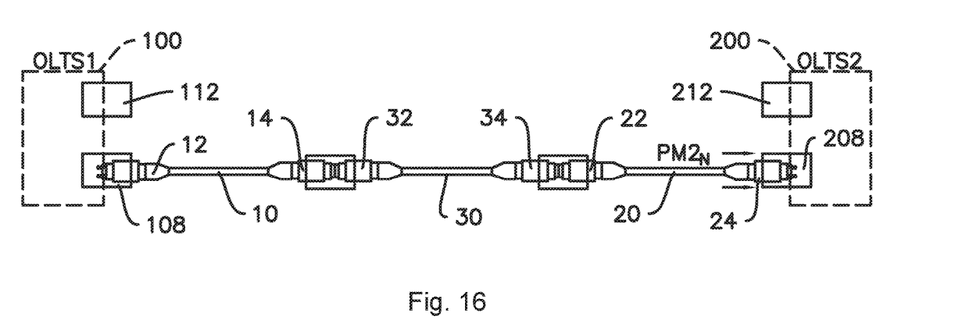
FIG. 16 is a schematic illustrating a second characterization power value of the second OLTS of FIG. 15 being obtained.
Figure 17:
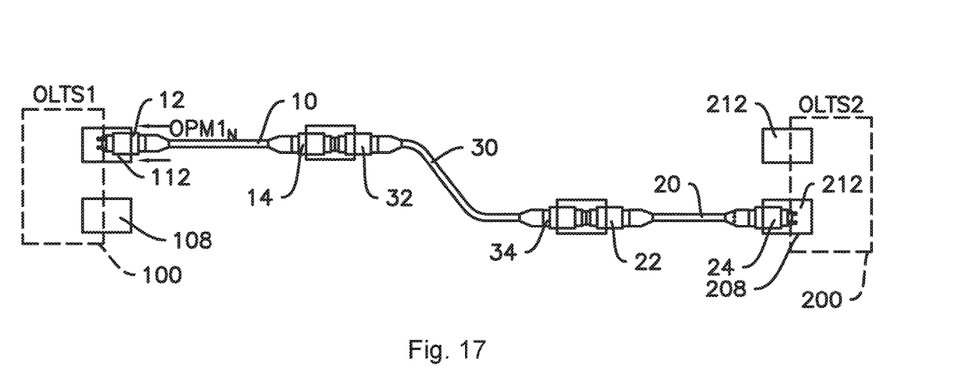
FIG. 17 is a schematic illustrating a first characterization power value of the first OLTS of FIG. 15 being obtained.
Figure 18:
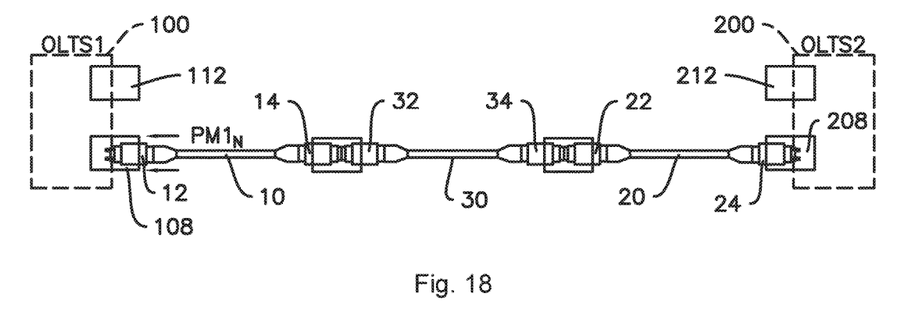
FIG. 18 is a schematic illustrating a second characterization power value of the first OLTS of FIG. 15 being obtained.

FIG. 15 illustrates a configuration for obtaining a first characterization power ($OPM2_N$) for the second OLTS 200, similar to that shown in FIGS. 1 and 5 and described above, where the test cables 10, 20 are MPO cables and the third test cable 30 is provided and is also a MPO cable. FIG. 16 illustrates a configuration for obtaining a second characterization power ($PM2_N$) for the second OLTS 200, similar to that shown in FIGS. 2 and 6 and described above, where the test cables 10, 20 are MPO cables and the third test cable 30 is provided and is also a MPO cable. FIG. 17 illustrates a configuration for obtaining a first characterization power (OPM1$_N$) for the first OLTS 100, similar to that shown in FIG. 3 and described above, where the test cables 10, 20 are MPO cables and the third test cable 30 is provided and is also a MPO cable. FIG. 18 illustrates a configuration for obtaining a second characterization power (PM1$_N$) for the first OLTS 100, similar to that shown in FIG. 4 and described above, where the test cables 10, 20 are MPO cables and the third test cable 30 is provided and is also a MPO cable.

Figure 19:
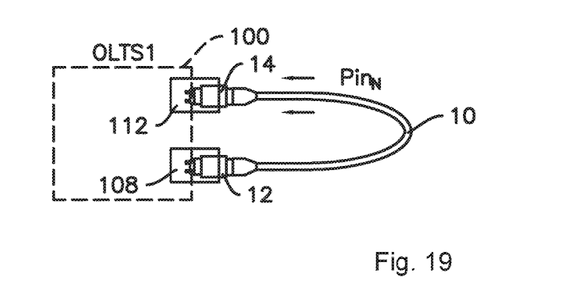
FIG. 19 is a schematic illustrating a first reference power such as may be used in optical return loss testing being obtained with a multi-fiber push-on cable in accordance with one or more embodiments of the present disclosure.
Figure 20:
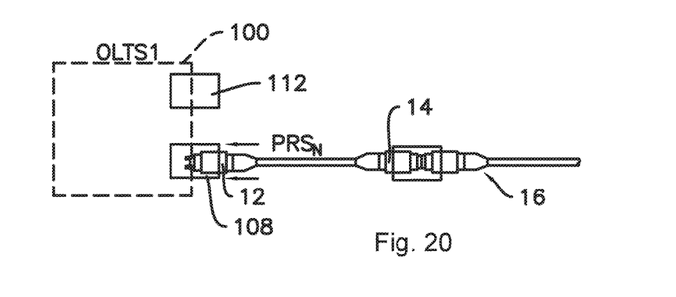
FIG. 20 is a schematic illustrating a second reference power such as may be used in optical return loss testing being obtained with the multi-fiber push-on cable of FIG. 19.
Figure 21:
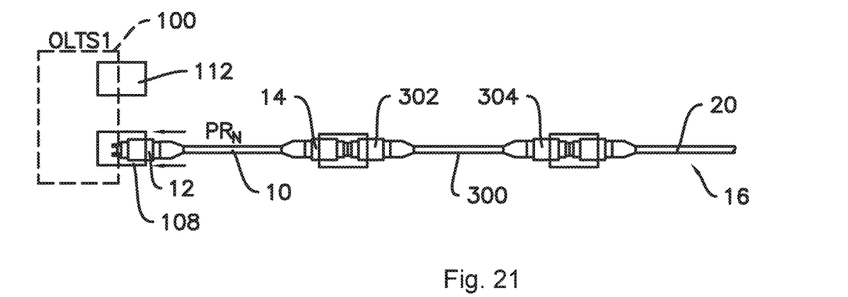
FIG. 21 is a schematic illustrating a testing configuration such as may be used in optical return loss testing with the multi-fiber push-on cable of FIG. 19.

Exemplary methods of optical return loss testing according to the present disclosure may also be applied with MPO cables, for example, using configurations such as those illustrated in FIGS. 19 through 21. FIG. 19 illustrates a configuration for obtaining an input power (P$_{INN}$), similar to that shown in FIG. 7 and described above, where the test cable 10 is a MPO cable. FIG. 20 illustrates a configuration for obtaining an internally reflected power (P$_{RSN}$), similar to that shown in FIG. 8 and described above, where the test cable 10 is a MPO cable. FIG. 21 illustrates a configuration for determining an optical return loss ORL of the optical device 300, similar to that shown in FIG. 9 and described above, where the test cables 10, 20 and the optical device 300 are MPO cables.

Figure 22:
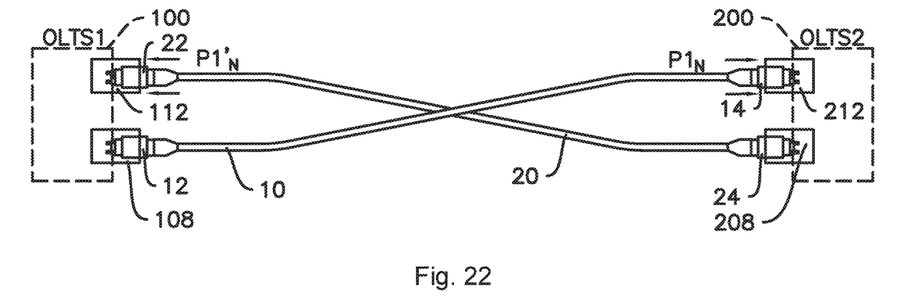
FIG. 22 is a schematic illustrating a referencing configuration with multi-fiber push-on cables such as may be used for obtaining reference powers for use in bi-directional testing in accordance with one or more additional embodiments of the present disclosure.
Figure 23:
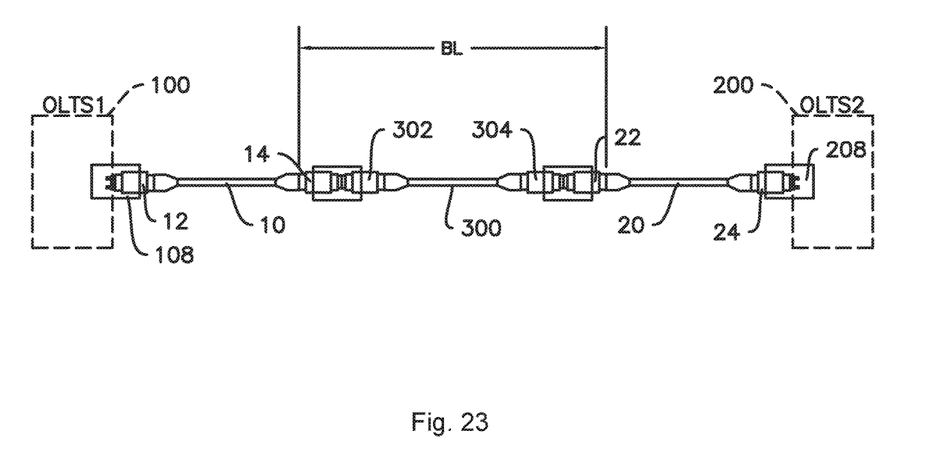
FIG. 23 is a schematic illustrating a testing configuration with the multi-fiber push-on cables of FIG. 22 such as may be used in bi-directional testing.

Exemplary methods of bi-directional loss testing according to the present disclosure may also be applied with MPO cables, for example, using configurations such as those illustrated in FIGS. 22 and 23. FIG. 22 illustrates a configuration for obtaining a first reference power (P1$_N$) and a second reference power (P1'$_N$), similar to that shown in FIG. 10 and described above, where the test cables 10, 20 are MPO cables. FIG. 23 illustrates a configuration for determining a bi-directional loss BL, similar to that shown in FIG. 11 and described above, where the test cables 10, 20 and the optical device 300 are MPO cables.

As used herein, the terms "first," "second," and "third" may be used interchangeably to distinguish one component from another and do not necessarily signify sequence or importance of the individual components. However, such terms may be used herein to identify a correspondence or other relationship between components. For example, the second test cable 20 generally corresponds to the second OLTS 200, e.g., although the second test cable 20 may in some embodiments be directly connected to the first OLTS 100 during at least one step of the exemplary methods, the second test cable 20 corresponds to the second OLTS 200 in that the second test cable 20 remains directly connected to the connection port 208 of the second OLTS 200 through a substantial portion of the disclosed steps, e.g., particularly the referencing and testing steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of testing an optical device using a first optical loss test set ("OLTS"), the method comprising:
   characterizing the first OLTS, comprising:
      connecting a first end of a first test cable directly to a second power meter of the first OLTS, connecting a second end of the first test cable to a first end of a second test cable, and connecting a second end of the second test cable directly to a connection port of a second OLTS, the connection port of the second OLTS in optical communication with a light source of the second OLTS;
      determining a first characterization power of the first OLTS by measuring an optical power of light transmitted from the light source of the second OLTS with the second power meter of the first OLTS;
      disconnecting the first end of the first test cable from the second power meter of the first OLTS and connecting the first end of the first test cable directly to a connection port of the first OLTS, the connection port of the first OLTS in optical communication with a first power meter of the first OLTS and a light source of the first OLTS; and
      determining a second characterization power of the first OLTS by measuring an optical power of light transmitted from the light source of the second OLTS with the first power meter of the first OLTS;
   determining a reference power;
   connecting the second end of the first test cable to the optical device;
   transmitting light from the light source of the first OLTS through the first test cable to the optical device; and
   determining a loss of the optical device based on an optical power level associated with the optical device measured with the first power meter of the first OLTS, the first characterization power, the second characterization power, and the reference power.

2. The method of claim 1, wherein the first end of the first test cable remains connected to the connection port of the first OLTS and the second end of the second test cable remains connected to the connection port of the second OLTS throughout the steps of determining the reference power, connecting the second end of the first test cable to the optical device, transmitting light from the light source of the first OLTS through the first test cable to the optical device, and determining the loss of the optical device.

3. The method of claim 1, further comprising characterizing the second OLTS prior to characterizing the first OLTS, wherein characterizing the second OLTS comprises:
   connecting the first end of the second test cable to the connection port of the first OLTS and connecting the second end of the second test cable directly to a second power meter of the second OLTS;
   transmitting light from the light source of the first OLTS to the second power meter of the second OLTS;
   determining a first characterization power of the second OLTS by measuring an optical power of the transmitted light from the light source of the first OLTS with the second power meter of the second OLTS;
   disconnecting the second end of the second test cable from the second power meter of the second OLTS and connecting the second end of the second test cable directly to a connection port of the second OLTS, the connection port of the second OLTS in optical communication with a first power meter of the second OLTS and the light source of the second OLTS;
   transmitting light from the light source of the first OLTS to the first power meter of the second OLTS; and
   determining a second characterization power of the second OLTS by measuring an optical power of the transmitted light from the light source of the first OLTS with the first power meter of the second OLTS.

4. The method of claim 3, wherein determining the loss of the optical device comprises determining a bi-directional loss, wherein the step of connecting the second end of the first test cable to the optical device comprises connecting the second end of the first test cable to a first end of the optical device, wherein the method further comprises connecting the first end of the second test cable to a second end of the optical device and transmitting light from the light source of the second OLTS through the second cable to the optical device, and wherein the bi-directional loss of the optical device is determined based on an optical power level of light transmitted from the light source of the second OLTS measured with the first power meter of the first OLTS and an optical power level of light transmitted from the light source of the first OLTS measured with the first power meter of the second OLTS.

5. The method of claim 3, wherein the step of determining the reference power comprises:
  connecting the second end of the first test cable to the second power meter of the second OLTS and connecting the first end of the second test cable to the second power meter of the first OLTS; and
  determining a first reference power measured from the light source of the first OLTS to the second power meter of the second OLTS and determining a second reference power measured from the light source of the second OLTS to the second power meter of the first OLTS.

6. The method of claim 1, further comprising characterizing the second OLTS prior to characterizing the first OLTS, wherein characterizing the second OLTS comprises:
  connecting the first end of the first test cable directly to the connection port of the first OLTS, connecting the second end of the first test cable to the first end of the second test cable, and connecting the second end of the second test cable directly to a second power meter of the second OLTS;
  transmitting light from the light source of the first OLTS through the first test cable and the second test cable to the second power meter of the second OLTS;
  determining a first characterization power of the second OLTS by measuring an optical power of the transmitted light from the light source of the first OLTS with the second power meter of the second OLTS;
  disconnecting the second end of the second test cable from the second power meter of the second OLTS and connecting the second end of the second test cable directly to the connection port of the second OLTS, the connection port of the second OLTS in optical communication with the light source of the second OLTS and a first power meter of the second OLTS;
  transmitting light from the light source of the first OLTS through the first test cable and the second test cable to the first power meter of the second OLTS; and
  determining a second characterization power of the second OLTS by measuring an optical power of the transmitted light from the light source of the first OLTS with the first power meter of the second OLTS.

7. The method of claim 6, wherein determining the loss of the optical device comprises determining a bi-directional loss, wherein:
  the step of determining the reference power comprises:
    connecting the second end of the first test cable directly to the second power meter of the second OLTS and connecting the first end of the second test cable directly to the second power meter of the first OLTS; and
    determining a first reference power by measuring an optical power of light transmitted from the light source of the first OLTS to the second power meter of the second OLTS and determining a second reference power by measuring an optical power of light transmitted from the light source of the second OLTS to the second power meter of the first OLTS;
  wherein the step of connecting the second end of the first test cable to the optical device comprises connecting the second end of the first test cable to a first end of the optical device;
  wherein the method further comprises connecting the first end of the second test cable to a second end of the optical device and transmitting light from the light source of the second OLTS through the second cable to the optical device; and
  wherein the bi-directional loss of the optical device is determined based on an optical power level of light transmitted from the light source of the second OLTS measured with the first power meter of the first OLTS and an optical power level of light transmitted from the light source of the first OLTS measured with the first power meter of the second OLTS.

8. The method of claim 1, wherein determining the loss of the optical device comprises determining an optical return loss, wherein the step of determining the reference power comprises connecting the second end of the first test cable to the second power meter of the first OLTS, determining a first reference power measured from the light source of the first OLTS to the second power meter of the first OLTS, disconnecting the second end of the first test cable from the second power meter of the first OLTS, applying an optical termination at the second end of the first test cable, and determining a second reference power by measuring the internally reflected power within the OLTS.

9. The method of claim 8, wherein the step of connecting the second end of the first test cable to the optical device comprises connecting the second end of the first test cable to a first end of the optical device, wherein the method further comprises connecting the first end of the second test cable to a second end of the optical device and applying an optical termination at the second end of the second test cable or the second test cable itself, and wherein the optical power level associated with the optical device measured with the first power meter of the first OLTS is an optical power level of reflected light from the optical device.

10. The method of claim 1, wherein connecting the second end of the first test cable to the first end of the second test cable during the step of characterizing the first OLTS comprises connecting the second end of the first test cable directly to a first end of a third test cable and connecting a second end of the third test cable directly to the first end of the second test cable.

11. The method of claim 1, wherein the first test cable, the second test cable, and the optical device each comprises a multi-fiber push-on cable.

12. A method of characterizing an optical test system, the optical test system comprising a first optical loss test set ("OLTS") and a second OLTS, the method comprising:
  connecting a first end of a second test cable directly to a connection port of the first OLTS, the connection port of the first OLTS in optical communication with a first power meter of the first OLTS and a stabilized light source of the first OLTS, and connecting a second end of the second test cable directly to a second power meter of the second OLTS;
  transmitting light from the stabilized light source of the first OLTS to the second power meter of the second OLTS through the second test cable;

measuring an optical power of the transmitted light from the stabilized light source of the first OLTS with the second power meter of the second OLTS;

disconnecting the second end of the second test cable from the second power meter of the second OLTS;

connecting the second end of the second test cable directly to a connection port of the second OLTS, the connection port of the second OLTS in optical communication with a first power meter of the second OLTS and a stabilized light source of the second OLTS;

transmitting light from the stabilized light source of the first OLTS to the first power meter of the second OLTS through the second test cable;

measuring an optical power of the transmitted light from the stabilized light source of the first OLTS with the first power meter of the second OLTS;

disconnecting the first end of the second test cable from the connection port of the first OLTS;

connecting a first end of a first test cable directly to a second power meter of the first OLTS and connecting a second end of the first test cable directly to the first end of the second test cable;

transmitting light from the stabilized light source of the second OLTS to the second power meter of the first OLTS through the first test cable and the second test cable;

measuring an optical power of the transmitted light from the stabilized light source of the second OLTS with the second power meter of the first OLTS;

disconnecting the first end of the first test cable from the second power meter of the first OLTS;

connecting the first end of the first test cable directly to the connection port of the first OLTS;

transmitting light from the stabilized light source of the second OLTS to the first power meter of the first OLTS through the first test cable and the second test cable; and measuring an optical power of the transmitted light from the stabilized light source of the second OLTS with the first power meter of the first OLTS.

13. The method of claim 12, wherein the second end of the second test cable remains connected to the connection port of the second OLTS after the step of connecting the second end of the second test cable to the connection port of the second OLTS, and wherein the first end of the first test cable remains connected to the connection port of the first OLTS after the step of connecting the first end of the first test cable to the connection port of the first OLTS.

14. The method of claim 12, wherein the method does not include disconnecting the second end of the second test cable from the connection port of the second OLTS or disconnecting the first end of the first test cable from the connection port of the first OTLS.

15. A method of characterizing an optical test system, the optical test system comprising a first optical loss test set ("OLTS") and a second OLTS, the method comprising:

obtaining a first characterization power value for the first OLTS by connecting a first end of a first test cable directly to a second power meter of the first OLTS, connecting a second end of the first test cable to a first end of a second test cable, the second test cable comprising a second end connected directly to a connection port of the second OLTS, the connection port of the second OLTS in optical communication with a first power meter of the second OLTS and a stabilized light source of the second OLTS, transmitting light from the stabilized light source of the second OLTS through the first and second test cables to the second power meter of the first OLTS, and measuring an optical power of the transmitted light from the stabilized light source of the second OLTS with the second power meter of the first OLTS; and obtaining a second characterization power value for the first OLTS by disconnecting the first end of the first test cable from the second power meter of the first OLTS, connecting the first end of the first test cable directly to a connection port of the first OLTS, the connection port of the first OLTS in optical communication with a first power meter of the first OLTS and a stabilized light source of the first OLTS, transmitting light from the stabilized light source of the second OLTS through the first and second test cables to the first power meter of the first OLTS, and measuring an optical power of the transmitted light from the stabilized light source of the second OLTS with the first power meter of the first OLTS.

16. The method of claim 15, further comprising characterizing the second OLTS prior to obtaining the first and second characterization power values for the first OLTS, wherein characterizing the second OLTS comprises:

obtaining a first characterization power value for the second OLTS by connecting the first end of the first test cable directly to the connection port of the first OLTS, connecting the second end of the first test cable to the first end of the second test cable, connecting the second end of the second test cable directly to a second power meter of the second OLTS, transmitting light from the stabilized light source of the first OLTS through the first test cable and the second test cable to the second power meter of the second OLTS, and measuring an optical power of the transmitted light from the stabilized light source of the first OLTS with the second power meter of the second OLTS; and obtaining a second characterization power value for the second OLTS by disconnecting the second end of the second test cable from the second power meter of the second OTLS, connecting the second end of the second test cable directly to the connection port of the second OLTS, transmitting light from the stabilized light source of the first OLTS through the first test cable and the second test cable to the first power meter of the second OLTS, and measuring an optical power of the transmitted light from the stabilized light source of the first OLTS with the first power meter of the second OLTS.

17. The method of claim 16, wherein the first end of the first test cable remains connected to the connection port of the first OLTS after obtaining the second characterization power value for the first OLTS and wherein the method does not include disconnecting the second end of the second test cable from the connection port of the second OLTS.

18. The method of claim 15, wherein the second end of the first test cable is directly connected to the first end of a second test cable.

19. The method of claim 15, wherein the second end of the first test cable is connected to the first end of a second test cable via a third test cable.

20. The method of claim 15, wherein the first test cable and the second test cable each comprises a multi-fiber push-on cable.

* * * * *